United States Patent
Spitzbart

(10) Patent No.: US 9,969,235 B2
(45) Date of Patent: May 15, 2018

(54) FOUR-WHEEL VEHICLE

(71) Applicant: Berthold Spitzbart, Vienna (AT)

(72) Inventor: Berthold Spitzbart, Vienna (AT)

(*) Notice: Subject to any disclaimer, the term of this patent is extended or adjusted under 35 U.S.C. 154(b) by 21 days.

(21) Appl. No.: 15/150,990

(22) Filed: May 10, 2016

(65) Prior Publication Data

US 2017/0120715 A1    May 4, 2017

(30) Foreign Application Priority Data

May 13, 2015 (AT) .................. A 299/2015

(51) Int. Cl.
| | |
|---|---|
| *A61G 5/04* | (2013.01) |
| *B60G 21/00* | (2006.01) |
| *B60G 17/0165* | (2006.01) |
| *B60G 3/01* | (2006.01) |
| *B60G 17/019* | (2006.01) |
| *B62D 57/024* | (2006.01) |
| *A61G 5/06* | (2006.01) |

(52) U.S. Cl.
CPC ........... *B60G 17/0165* (2013.01); *A61G 5/04* (2013.01); *A61G 5/061* (2013.01); *B60G 3/01* (2013.01); *B60G 17/01908* (2013.01); *B62D 57/024* (2013.01); *A61G 2203/42* (2013.01); *B60G 2204/62* (2013.01); *B60G 2204/83022* (2013.01); *B60G 2300/24* (2013.01)

(58) Field of Classification Search
CPC .. B60G 17/0165; B60G 3/01; B60G 2204/62; B60G 2204/83022; B60G 2300/24; B60G 21/00; B60G 21/007; A61G 5/04; A61G 5/061; A61G 2203/42; B62D 57/024
See application file for complete search history.

(56) References Cited

U.S. PATENT DOCUMENTS

| | | | | | |
|---|---|---|---|---|---|
| 3,459,436 | A | * | 8/1969 | Rusconi ................. | B60G 21/04 267/194 |
| 3,520,378 | A | * | 7/1970 | Slay ....................... | B62D 61/00 180/21 |
| 3,792,746 | A | * | 2/1974 | Phillips .................. | B60T 7/102 180/271 |
| 3,909,022 | A | * | 9/1975 | Claxton ................. | A01D 46/00 280/124.127 |
| 4,277,085 | A | * | 7/1981 | Bryansky ............. | B60G 11/006 280/104 |
| 4,630,543 | A | * | 12/1986 | McQueen ................ | B61B 7/02 104/119 |
| 6,805,209 | B2 | * | 10/2004 | Hedeen .................. | A61G 5/061 180/9.32 |
| 6,942,230 | B1 | * | 9/2005 | Fontdecaba Buj .... | B60G 11/16 280/124.104 |
| 2015/0196439 | A1 | * | 7/2015 | Osipov .................. | A61G 5/065 280/5.28 |

FOREIGN PATENT DOCUMENTS

DE    102013000724 A    7/2014

* cited by examiner

*Primary Examiner* — Faye M Fleming
(74) *Attorney, Agent, or Firm* — Andrew Wilford

(57) ABSTRACT

In a four-wheel vehicle with vertically independently movable wheels (2', 2", 3', 3"), diagonally opposite wheels (2', 2" or 3', 3") are connected to one another by respective cables (9, 90) guided over deflection rollers (11 to 15).

The traction cable mounting makes it possible to adapt the height of the wheels in the event of equal loading of the individual wheels independently of the terrain.

8 Claims, 4 Drawing Sheets

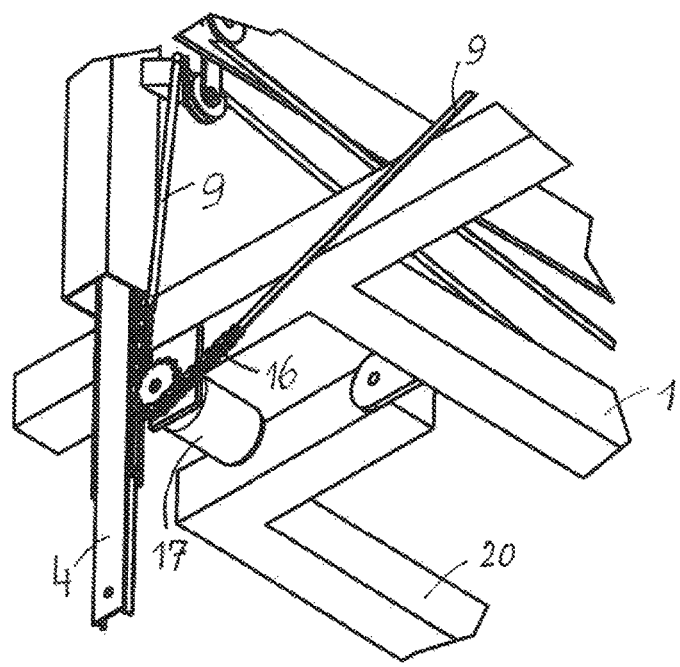
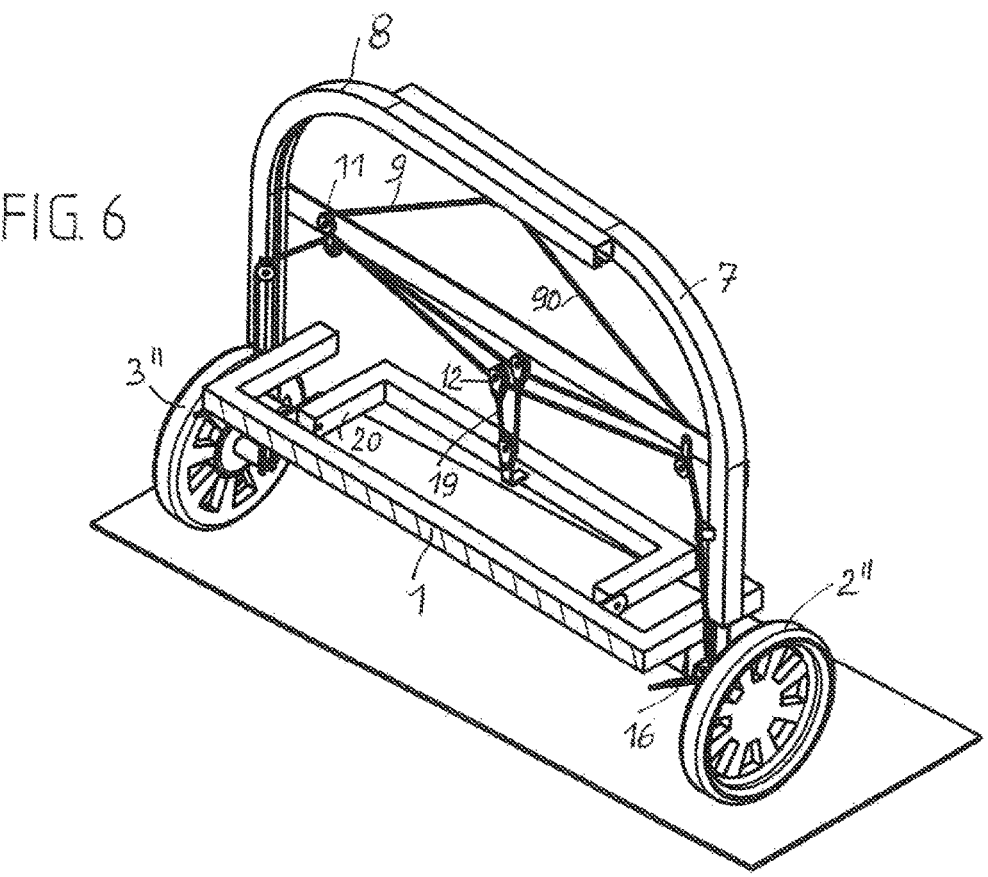

FOUR-WHEEL VEHICLE

FIELD OF THE INVENTION

The invention relates to a four-wheel vehicle with vertically independently movable wheels.

BACKGROUND OF THE INVENTION

In many cases it is desirable that the wheels of a vehicle adapt to the ground surface over which it is traveling in such a way that the vehicle body remains substantially horizontal, even if one wheel or a plurality of wheels for example goes into a depression in the ground.

According to a proposal disclosed by DE 102013000724, the chassis of a motorized wheelchair consists of longitudinal supports that are parallel to one another, spaced apart from one another, oriented in the direction of travel, and on each of which a front and rear wheel is fastened, the longitudinal supports being connected by pneumatic or hydraulic cylinders to at least one connection block to which a seat is fastened.

Such an arrangement is extremely complex and expensive.

OBJECT OF THE INVENTION

The object of the invention is to create a four-wheel vehicle that has a simpler construction and can be implemented substantially more cheaply.

SUMMARY OF THE INVENTION

This is achieved in that diagonally opposite wheels are connected to one another by respective cables guided over deflection rollers. The cable mounting according to the invention makes it possible to adapt the height of the wheels in the event of equal loading of the individual wheels independently of the terrain. Due to the mounting on two connected cables, both the horizontal orientation and also the height adjustment of the individual wheels on an uneven surface is possible at only two adjustment points.

It is advantageous if one of the deflection rollers of each cable is connected to the vehicle by an equalizing traction cable. This central connection of the cables guarantees a uniform distribution of the load over all wheels.

The suspension of the vehicle acts on the entire vehicle and not only on individual wheels by the extensibility of the cables or by additional suspension at the central mounting point. This prevents the vehicle from tilting downward by the extent of the suspension of the individual wheels or of the frame when off-road.

In order to enable vertical adjustment of the vehicle, according to a further feature of the invention the equalizing traction cable acts on an adjusting rocker.

According to a further feature of the invention, the cables each have a chain section movable by a respective motor, and level sensors are provided for controlling the motor.

As a result, the horizontal position of the vehicle body or of a seat in the case of wheelchairs can be ensured.

Guiding of the cables takes place partially in tubes that project upward and then bend into the horizontal.

In order to make it possible to climb steps, a star wheel can be operatively connected to a wheel.

BRIEF DESCRIPTION OF THE DRAWING

The invention is explained in greater detail with reference to an embodiment shown in the drawings, without being limited to this example. In the drawings:

FIG. 5 is a diagrammatic view from below of a detail;

FIG. 6 is a diagrammatic view of the rear part of a vehicle according to the invention;

SPECIFIC DESCRIPTION OF THE INVENTION

According to the drawings, a schematically illustrated chassis 1 is supported on four wheels 2', 2"; 3', 3", the wheels 2' and 2" as well as 3' and 3" being diagonally opposite one another. All wheels are rotatably supported on wheel mounts 4 and the wheel mounts 4 are vertically movable in respective tubes 5, 6, 7, 8.

Figure 3:
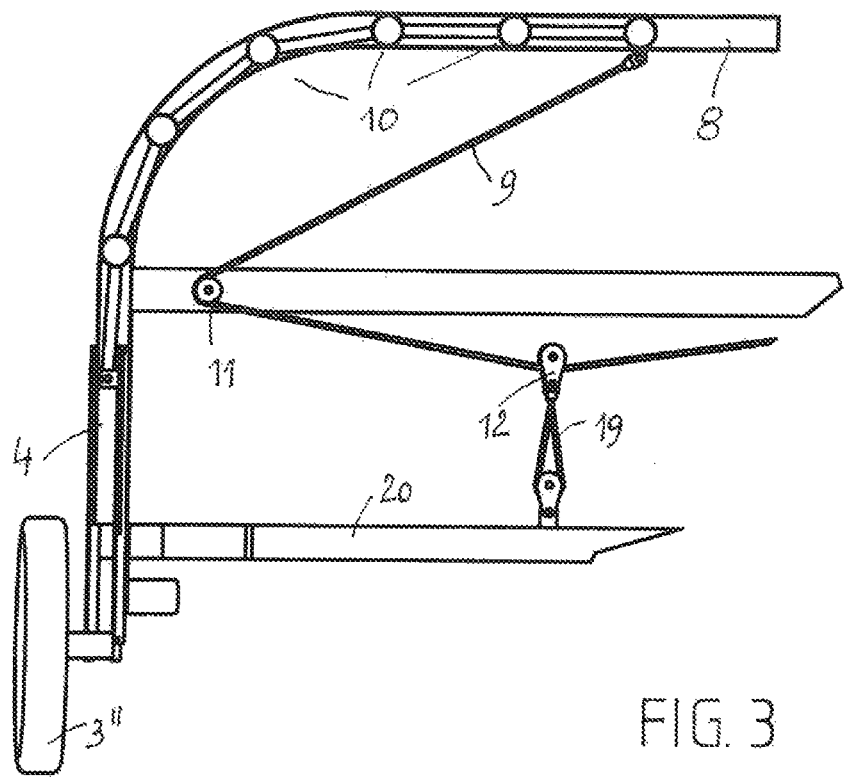
FIG. 3 shows a detail of the wheel mount.
Figure 4:
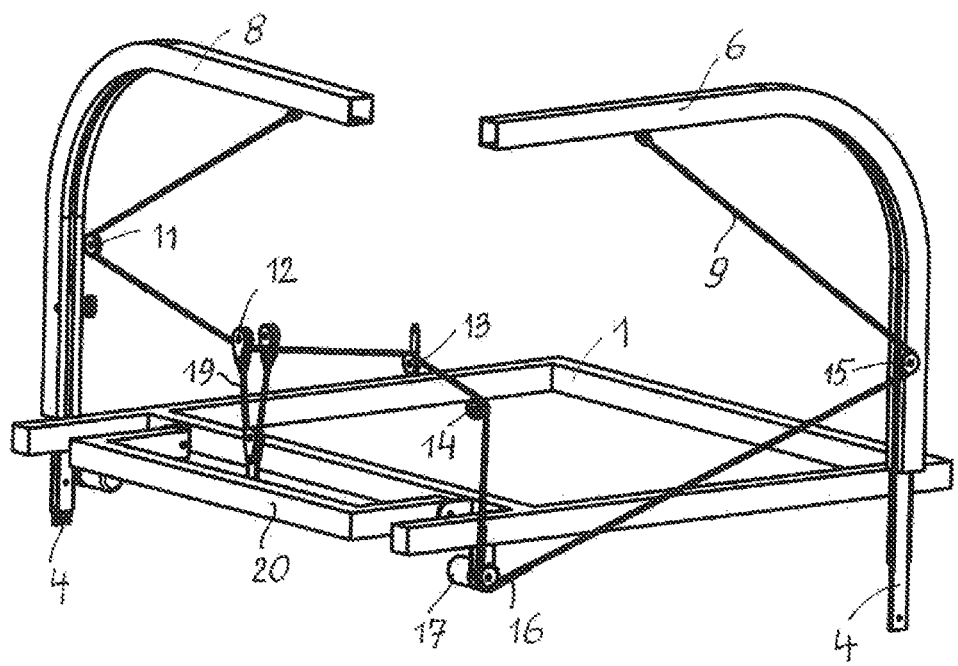
FIG. 4 shows the cable path from one wheel mount to the diagonally opposite wheel mount, where for the sake of clarity the second cable has been omitted.

In particular, FIG. 4, in which only the tubes 6 and 8 are illustrated, shows in conjunction with FIG. 3 that diagonally opposite wheels 3', 3" or wheel mounts 4 are connected to one another by a cable 9.

As can be seen from FIG. 3, one end of this cable 9 is guided by rollers 10 in the tube 8 and is connected to the wheel mount 4 of the wheel 3".

Rollers 11, 12, 13, 14 and 15 deflect the cable 9 into the interior of the tube 6 of the diagonally opposite wheel mount 4.

Figure 1:
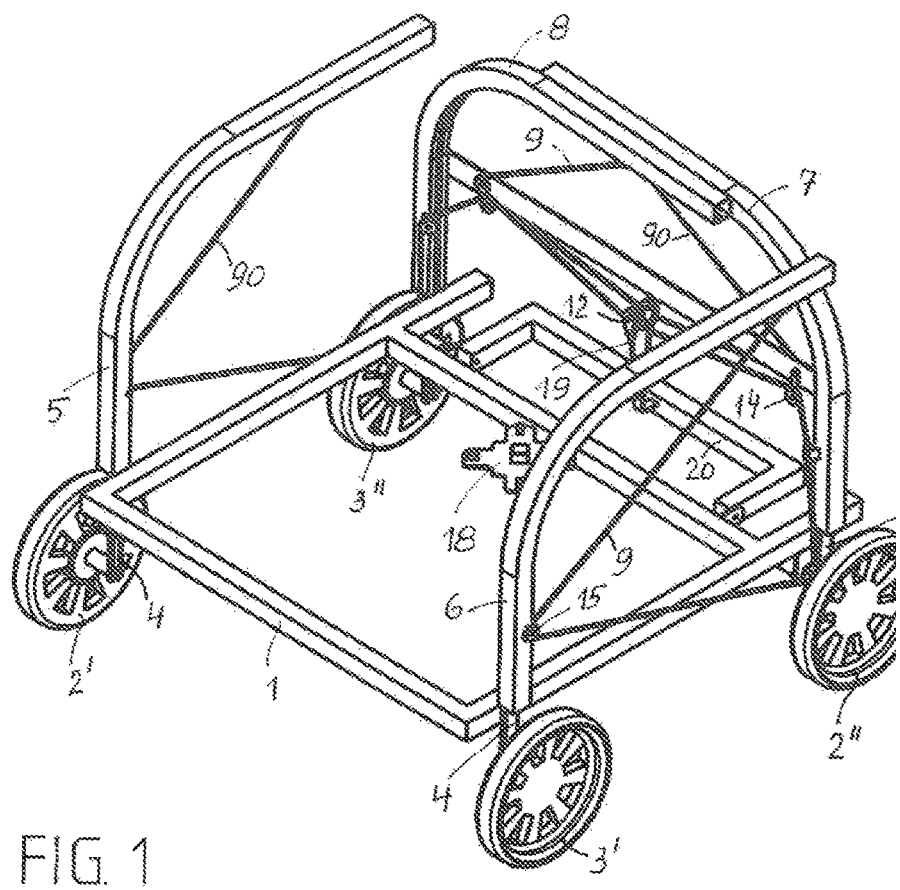
FIG. 1 is a diagrammatic view of the essential parts of a vehicle according to the invention.
Figure 2:
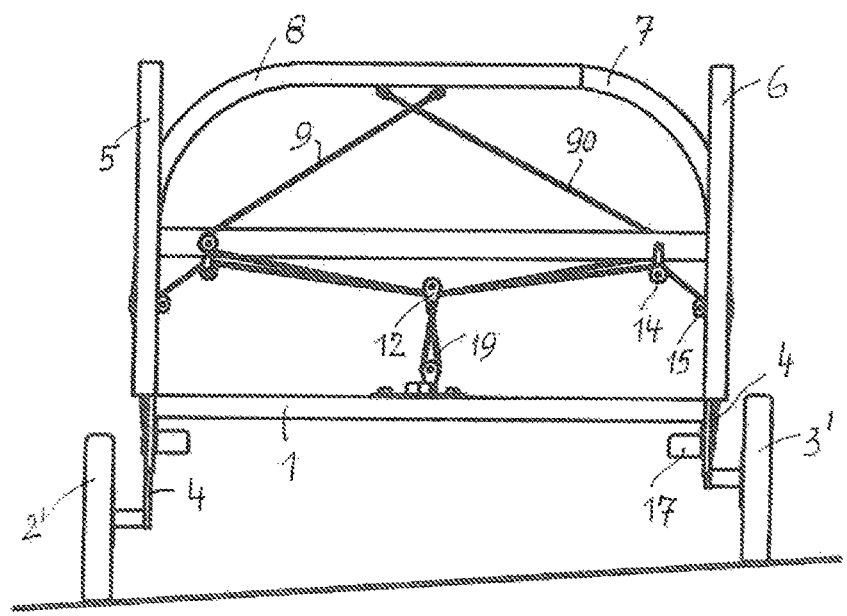
FIG. 2 is a front view of the vehicle according to FIG. 1.
Figure 8:
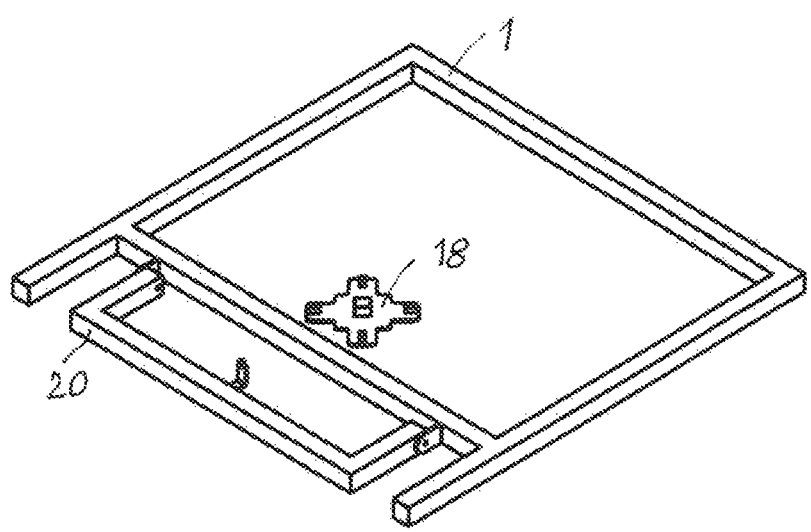
FIG. 8 shows the installation of a level sensor.

Moreover, the cable 9 has a chain section 16 that can be moved by a motor 17, and a level sensor 18 (FIG. 1, FIG. 8) is provided for controlling the motor 17.

The deflecting roller 12 is fastened to an equalizing traction cable 19 that engages on an adjusting rocker 20.

The wheels 2', 2" or the wheel mounts 4 thereof are connected to one another in an equivalent manner by a cable 90.

The tubes 5, 6, 7 and 8 are bent at a right angle in the upper part in order to elevate the deflection rollers that support the load.

The equalizing traction cable 19 or the equalizing traction cable running parallel thereto of the other wheel ensures that all four wheels 2', 2", 3', 3" also touch the ground and support the same load even if the ground surface is not uniformly level. Uniform distribution of the load is a crucial prerequisite in order always to apply the force from an individual driven wheel to the ground surface and thus, even without driving all wheels, to prevent sliding or spinning.

However, a four-wheel vehicle according to the invention is also possible in which, as in the illustrated example, none of the four wheels is driven.

The motor 17 or its counterpart on the opposite side moves the cable 9 or the cable 90 by means of the integrated chain section 16 in each direction, which is necessary in order to restore a horizontal position. The control takes place by means of level sensors 18. Four level sensors 18 are arranged diagonally relative to the direction of travel and are therefore each juxtaposed with a respective wheel 2', 2", 3', 3". If the vehicle tilts in the direction of a wheel 2', 2", 3', 3", the corresponding level sensor 18 activates the motor 17 in the direction of rotation that pulls the cable 9 or 90 in the direction of the wheel in the higher position until the horizontal position is reached again and as a result the level sensor 18 is switched off.

If the vehicle tilts, for example, according toward the front left, the motor must pull the corresponding cable to the rear in order to achieve a horizontal position. If the vehicle tilts toward the back right, the level sensor 18 at back right is tripped and the motor 17 turns in the opposite direction.

If the vehicle tilts forward, backward or to the side, two sensors 18 are each tripped accordingly and both motors 17 turn simultaneously in the corresponding direction until the horizontal position is restored and then they switch off.

The diagonally opposite level sensors 18 each activate the same motors 17 in different directions of rotation. The mounting of the vehicle on two cables 9, 90 connected by an equalizing traction cable 19 enables the horizontal position of the vehicle independently of the terrain and the inclination of the vehicle by corresponding activation of the two motors.

The control by level sensors 18 is also triggered by centrifugal forces when driving round a curve and then leads to an inclination of the vehicle toward the curve and prevents the vehicle from tipping over.

The motors lock when the vehicle is not moving. Locking is likewise triggered if the inclination of the vehicle exceeds a predetermined angle.

A vertical adjustment of the vehicle can take place by means of the rocker 20.

Figure 7:
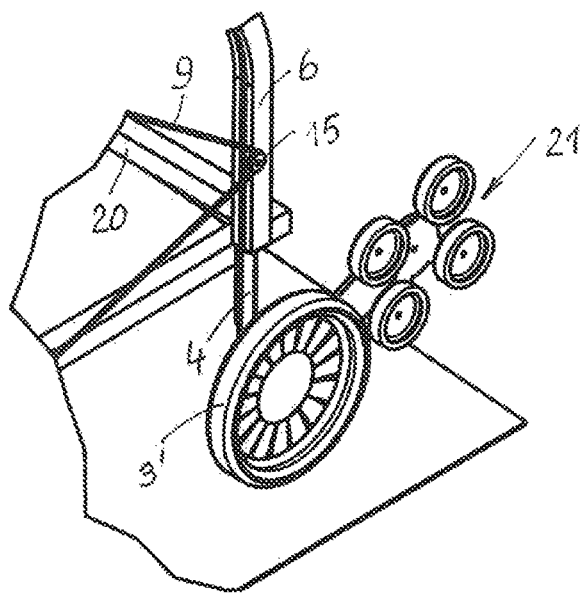
FIG. 7 shows the use of a star wheel.

For climbing steps, a star wheel 21 connected to a drive wheel can be used (FIG. 7).

Within the context of the invention, numerous modifications with respect to the described illustrated embodiment are possible. Thus the vehicle can be designed, for example, as a wheelchair with two larger wheels. In any case the invention makes it possible to design wheelchairs and other all-terrain vehicles that can also be operated off-road or on steps without the risk of tipping over, or when traveling around a curve they adopt an inclination that compensates for centrifugal force. The solution according to the invention is in principle independent of the drive means and thus is applicable both to different manually and motor-powered wheelchairs and vehicles.

The invention claimed is:

1. A four-wheel vehicle with four vertically independently movable wheels, wherein diagonally opposite wheels are connected to each other by a respective cable guided over deflection rollers, the cables each having a chain section movable by a respective motor, level sensors being provided for controlling the motors.

2. A four-wheel vehicle with four vertically independently movable wheels, wherein
    diagonally opposite wheels are connected to each other by a respective cable guided over deflection rollers,
    one of the deflection rollers of each cable is connected to the vehicle by an equalizing traction cable, and
    the equalizing traction cable acts on an adjusting rocker.

3. A four-wheel vehicle with four vertically independently movable wheels, wherein diagonally opposite wheels are connected to each other by a respective cable guided over deflection rollers and the cables are guided partially in tubes that project upward and bend horizontally.

4. A four-wheel vehicle with four vertically independently movable wheels, wherein diagonally opposite wheels are connected to each other by a respective cable guided over deflection rollers and a star wheel is operatively connected to at least one of the wheels.

5. A vehicle comprising:
    a chassis having four corners;
    respective vertically displaceable wheel mounts in the corners, each mount including a guide tube having a vertical portion and a post vertically shiftable in the vertical portion;
    two pairs of diagonally opposite wheels each carried on and vertically displaceable with a respective one of the posts;
    a respective cable for each pair having one end operatively connected to the post of one of the wheels of the respective pair and an opposite end connected to the post of the other of the wheels of the respective pair;
    respective sets of guides over which each of the cables are engaged between the respective ends; and
    means for tautening the cables with a predetermined tension between the respective ends such that, when one wheel of one of the pairs moves upward, the respective cable pulls the other wheel of the one pair downward and vice versa.

6. The vehicle according to claim 5, wherein the cables each have a chain section movable by a respective motor and level sensors are provided for controlling the motors.

7. The vehicle defined in claim 5, wherein the guides over which the cabled are engaged are sheaves.

8. The vehicle defined in claim 5, wherein each guide tube further comprises a respective horizontal portion forming a continuation of the respective vertical portion.

* * * * *